United States Patent
Li et al.

(10) Patent No.: US 12,542,820 B2
(45) Date of Patent: Feb. 3, 2026

(54) AUDIO PLAYING METHOD, APPARATUS AND NON-TRANSITORY COMPUTER-READABLE STORAGE MEDIUM

(71) Applicant: Douyin Vision (Beijing) Co., Ltd., Beijing (CN)

(72) Inventors: Xinyi Li, Beijing (CN); Haoran Zhang, Beijing (CN); Peijun Guo, Beijing (CN); Ruie Gao, Beijing (CN)

(73) Assignee: DOUYIN VISION (BEIJING) CO., LTD., Beijing (CN)

( * ) Notice: Subject to any disclaimer, the term of this patent is extended or adjusted under 35 U.S.C. 154(b) by 0 days.

(21) Appl. No.: 18/343,234

(22) Filed: Jun. 28, 2023

(65) Prior Publication Data

US 2024/0007515 A1    Jan. 4, 2024

(30) Foreign Application Priority Data

Jul. 1, 2022   (CN) .......................... 202210769350.9

(51) Int. Cl.
*H04L 65/61*     (2022.01)
*H04L 65/4061*   (2022.01)
*H04L 65/60*     (2022.01)

(52) U.S. Cl.
CPC .................................. *H04L 65/61* (2022.05)

(58) Field of Classification Search
CPC ....................................................... H04L 65/61
See application file for complete search history.

(56) References Cited

U.S. PATENT DOCUMENTS

| | | | | |
|---|---|---|---|---|
| 10,872,116 | B1* | 12/2020 | Yim | G06F 16/61 |
| 2004/0052338 | A1* | 3/2004 | Celi, Jr. | H04L 49/90 |
| | | | | 379/88.16 |
| 2009/0018898 | A1* | 1/2009 | Genen | G06Q 30/0631 |
| | | | | 705/26.7 |
| 2010/0064218 | A1* | 3/2010 | Bull | G06F 3/167 |
| | | | | 715/716 |
| 2010/0306657 | A1* | 12/2010 | Derbyshire | G06F 16/64 |
| | | | | 715/862 |

(Continued)

FOREIGN PATENT DOCUMENTS

| | | |
|---|---|---|
| AU | 3256100 A | 11/2000 |
| CN | 1276687 A | 12/2000 |

(Continued)

OTHER PUBLICATIONS

Office Action for Chinese Patent Application No. 202210769350.9, mailed Jan. 11, 2024, 20 pages.

(Continued)

*Primary Examiner* — Oleg Survillo
(74) *Attorney, Agent, or Firm* — Astute IP Law Group

(57) ABSTRACT

The present disclosure relates to an audio playing method, apparatus and non-transitory computer-readable storage medium, and relates to the field of audio processing. The audio playing method includes: playing an audio clip of an audio content for a browsing user, in a case where the browsing user browses to the audio content in a feed; playing a complete audio of the audio content for the browsing user, in response to a first preset operation performed by the browsing user.

17 Claims, 6 Drawing Sheets

(56) References Cited

U.S. PATENT DOCUMENTS

| | | | | |
|---|---|---|---|---|
| 2011/0234480 | A1* | 9/2011 | Fino | G11B 27/105 345/156 |
| 2014/0068434 | A1* | 3/2014 | Filev | G06F 3/0484 715/716 |
| 2016/0225000 | A1* | 8/2016 | Glasgow | G06Q 30/0207 |
| 2019/0163336 | A1* | 5/2019 | Yu | H04N 21/4314 |
| 2019/0339829 | A1* | 11/2019 | Janis | G06F 3/04842 |
| 2022/0321966 | A1 | 10/2022 | Feng et al. | |
| 2022/0327154 | A1* | 10/2022 | Huang | G06F 3/0488 |
| 2023/0070812 | A1 | 3/2023 | Li et al. | |
| 2023/0297324 | A1* | 9/2023 | Yu | H04N 21/4852 700/94 |
| 2024/0061560 | A1* | 2/2024 | Sun | G06F 3/0484 |

FOREIGN PATENT DOCUMENTS

| | | |
|---|---|---|
| CN | 1758795 A | 4/2006 |
| CN | 101835113 A | 9/2010 |
| CN | 106162378 A | 11/2016 |
| CN | 108962220 A | 12/2018 |
| CN | 305154693 S | 5/2019 |
| CN | 111464858 A | 7/2020 |
| CN | 111930973 A | 11/2020 |
| CN | 111935357 A | 11/2020 |
| CN | 112118481 A | 12/2020 |
| CN | 112347273 A | 2/2021 |
| CN | 112449231 A | 3/2021 |
| CN | 113407289 A | 9/2021 |
| CN | 115174536 A | 10/2022 |
| WO | 2019/056341 A1 | 3/2019 |

OTHER PUBLICATIONS

International Search Report and Written Opinion in PCT/CN2023/102708, mailed Sep. 19, 2023, 8 pages.
Office Action for Chinese Patent Application No. 202210769350, mailed on Oct. 8, 2024, 16 Pages.
Rejection Decision for Chinese Patent Application No. 202210769350.9, mailed on Dec. 24, 2024, 18 Pages.
Notice of Allowance received for Chinese Patent Application No. 202210769350.9, mailed on Jul. 1, 2025, 8 pages (4 pages of English Translation and 4 pages of Original copy attached).

* cited by examiner

AUDIO PLAYING METHOD, APPARATUS AND NON-TRANSITORY COMPUTER-READABLE STORAGE MEDIUM

CROSS-REFERENCE TO RELATED APPLICATIONS

The present application is based on the application with a CN application number of 202210769350.9 and the filing date being Jul. 1, 2022, and claims its priority. The disclosure of this CN application as a whole is incorporated into the present application herein by reference.

TECHNICAL FIELD

The present disclosure relates to the field of audio processing, and in particular, to an audio playing method, an audio playing apparatus, and a non-transitory computer-readable storage medium.

BACKGROUND

In the related art, audio program push platforms play corresponding audio programs according to the program selection of browsing users.

SUMMARY

According to some embodiments of the present disclosure, an audio playing method is provided, comprising: playing an audio clip of an audio content for a browsing user, in a case where the browsing user browses to the audio content in a feed; playing a complete audio of the audio content for the browsing user, in response to a first preset operation performed by the browsing user.

In some embodiments, playing a complete audio of the audio content for the browsing user, in response to a first preset operation performed by the browsing user comprises: in response to a first preset operation performed by the browsing user on the first preset control in the play interface of the audio content, playing the complete audio.

In some embodiments, the audio playing method further comprises: displaying the first preset control in a first form, in a case where the browsing user browses to the audio content; after a preset period of time, displaying the first preset control in a second form for guiding the browsing user to perform a first preset operation.

In some embodiments, the first form is a first preset color, and the second form is a second preset color.

In some embodiments, the first form has a transparency higher than the second form.

In some embodiments, the audio playing method further comprises: adding the complete audio of the audio content to the favorites of the browsing user, in response to a second preset operation performed by the browsing user.

In some embodiments, adding the complete audio of the audio content to the favorites of the browsing user, in response to a second preset operation performed by the browsing user comprises: adding the complete audio of the audio content to the favorites of the browsing user, in response to the second preset operation of the browsing user performed on a second preset control in the play interface of the audio content.

In some embodiments, the audio playing method further comprises: switching to a play of another media content contained in the feed, in response to a third preset operation performed by the browsing user, in the case of a play of the audio clip, wherein the feed comprises a content of another category than the audio content; switching to a play of another audio content in an audio album to which the audio content belongs, or an audio content in another audio album, in response to a fourth preset operation performed by the browsing user, in the case of a play of the complete album.

In some embodiments, the fourth preset operation comprises a first switching operation and a second switching operation, and wherein in response to a fourth preset operation performed by the browsing user, switching to a play of another audio content in an audio album to which the audio content belongs, or an audio content in another audio album comprises: in response to the first switching operation performed by the browsing user, switching to the play of another audio contents in an audio album to which the audio content belongs; in response to a second switching operation performed by the browsing user, switching to the play of audio contents in the another audio album.

In some embodiments, the first switching operation and the second switching operation are sliding operations in different directions.

In some embodiments, the audio playing method further comprises: in response to inputting, by a publishing user, a clipping information for the complete audio, generating a visual content for an audio clip corresponding to the clipping information, wherein the visual content is provided with a first preset control for switching from a play of the audio clip to the play of the complete audio; in response to a publishing operation of the publishing user, publishing the audio content into a feed, wherein the audio content comprises the visual content; wherein playing an audio clip of an audio content for a browsing user, in a case where the browsing user browses to the audio content in a feed comprises: playing the audio clip for the browsing user, in the case where the browsing user browses to the visual content.

In some embodiments, the audio playing method further comprises: determining a background color for the play interface of the audio content according to colors comprised in a cover image of an audio album to which the audio content belongs.

In some embodiments, the audio content comprises a visual content, and the play interface of the visual content comprises at least one of a cover image of an audio album to which the audio content belongs, or related text contents of the audio content.

In some embodiments, the feed comprises multiple media contents, comprising at least one of video content, audio content, image content, or text content.

According to other embodiments of the present disclosure, there is provided an audio playing apparatus, comprising: a first play unit for, playing an audio clip of an audio content for a browsing user, in a case where the browsing user browses to the audio content in a feed; a second play unit for, playing a complete audio of the audio content for the browsing user, in response to a first preset operation performed by the browsing user.

In some embodiments, in response to a first preset operation performed by the browsing user on the first preset control in the play interface of the audio content, the second play unit plays the complete audio.

In some embodiments, the audio playing apparatus further comprises: a display unit for, displaying the first preset control in a first form, in a case where the browsing user browses to the audio content; and after a preset period of time, displaying the first preset control in a second form for guiding the browsing user to perform a first preset operation.

In some embodiments, the first form is a first preset color, and the second form is a second preset color.

In some embodiments, the first form has a transparency higher than the second form.

In some embodiments, the audio playing apparatus further comprises: an adding unit for, adding the complete audio of the audio content to the favorites of the browsing user, in response to a second preset operation performed by the browsing user.

In some embodiments, the audio playing apparatus further comprises: a switching unit for, switching to a play of another media content contained in the feed, in response to a third preset operation performed by the browsing user, in the case of a play of the audio clip, wherein the feed comprises a content of another category than the audio content; in the case of a play of the complete audio, in response to a fourth preset operation performed by the browsing user, switching to the play of another audio contents in an audio album to which the audio content belongs, or an audio content in another audio album.

In some embodiments, the fourth preset operation comprises a first switching operation and a second switching operation, wherein in response to a first switching operation performed by the browsing user, the switching unit switches to the play of another audio contents in the audio album to which the audio content belongs; in response to a second switching operation performed by the browsing user, switches to the play of audio contents in the another audio album.

In some embodiments, the first switching operation and the second switching operation are sliding operations in different directions.

In some embodiments, the display unit determines a background color for the play interface of the audio content according to colors comprised in the cover image of the audio album to which the audio content belongs.

In some embodiments, the audio playing apparatus further comprises: a publishing unit for, in response to inputting, by a publishing user, a clipping information for the complete audio, generating a visual content for an audio clip corresponding to the clipping information, wherein the visual content is provided with a first preset control for switching from a play of the audio clip to the play of the complete audio; in response to a publishing operation of the publishing user, publishing the audio content into a feed, wherein the audio content comprises the visual content; wherein in the case where a browsing user browses the visual content, the first play unit plays the audio clip for the browsing user.

In some embodiments, the audio content comprises a visual content, and the play interface of the visual content comprises at least one of a cover image of an audio album to which the audio content belongs, or related text contents of the audio content.

In some embodiments, the feed comprises multiple media contents, comprising at least one of video content, audio content, image content, or text content.

According to still other embodiments of the present disclosure, there is provided an audio playing apparatus, comprising: a memory; a processor coupled to the memory, the processor configured to, based on instructions stored in the memory, carry out the audio playing method according to any one of the above embodiments.

According to still other embodiments of the present disclosure, there is provided a non-transitory computer readable storage medium having stored thereon a computer program that, when executed by a processor, implements the audio playing method according to any one of the above embodiments.

BRIEF DESCRIPTION OF THE DRAWINGS

The accompanying drawings, which are incorporated in and constitute a portion of this specification, illustrate embodiments of the present disclosure and, together with the description, serve to explain the principles of the present disclosure.

The present disclosure will be more clearly understood from the following detailed description with reference to the accompanying drawings, in which.

DETAILED DESCRIPTION

Figure 1:
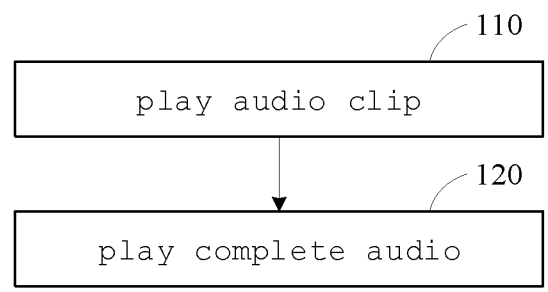
FIG. 1 shows a flowchart of some embodiments of a audio playing method of the present disclosure.

Various exemplary embodiments of the present disclosure will now be described in detail with reference to the accompanying drawings. Notice that, unless otherwise specified, the relative arrangement, numerical expressions and numerical values of the components and steps set forth in these examples do not limit the scope of the invention.

At the same time, it should be understood that, for ease of description, the dimensions of the various parts shown in the drawings are not drawn to actual proportions.

The following description of at least one exemplary embodiment is in fact merely illustrative and is in no way intended as a limitation to the invention, its application or use.

Techniques, methods, and apparatus known to those of ordinary skill in the relevant art may not be discussed in detail, but where appropriate, these techniques, methods, and apparatuses should be considered as part of the specification.

Of all the examples shown and discussed herein, any specific value should be construed as merely illustrative and not as a limitation. Thus, other examples of exemplary embodiments may have different values.

Notice that, similar reference numerals and letters are denoted by the like in the accompanying drawings, and therefore, once an article is defined in a drawing, there is no need for further discussion in the accompanying drawings.

The inventors of the present disclosure have found the following problems existed in the related art: the content push efficiency is low, resulting in poor user experience.

In view of this, the present disclosure proposes a technical solution for audio playing, which can improve the content push efficiency, thereby improving the browsing user's experience.

FIG. 1 shows a flowchart of some embodiments of a audio playing method of the present disclosure.

As shown in FIG. 1, in step 110, in a case where a browsing user browses to an audio content in a feed, an audio clip of the audio content is played for the browsing user. For example, the feed comprises multiple media contents, comprising at least one of video content, audio content, image content, or text content.

For example, a content publishing user of a media push platform may determine an audio clip of an audio content to be published. The audio clip can be a highlight part of the audio content it belongs to. In a case where a browsing user browses to the audio content, instead of playing the complete audio, the audio clip is played for the browsing user, so as to achieve the effect of attracting the browsing user faster and, on the other hand, helping the browsing user find an audio content of interest faster, thereby improving the content push efficiency and improving the browsing user's experience.

For example, the audio clip and the complete audio belong to the same audio file, sharing statistical data of the audio file, such as the number of Likes, the number of times of adding to Favorites, and the number of listens, etc.

In some embodiments, in response to inputting, by a publishing user, a clipping information for the complete audio, a visual content is generated for an audio clip corresponding to the clipping information, wherein the visual content is provided with a first preset control for switching from a play of the audio clip to the play of the complete audio; in response to a publishing operation of the publishing user, the audio content can be published into a feed, wherein the audio content comprises the visual content; in the case where a browsing user browses the visual content, the audio clip is played for the browsing user.

For example, a complete audio is acquired first. The complete audio is, for example, uploaded by a publishing user from a terminal locally or acquired from the network. The manner of network acquisition comprises, for example, acquisition from a cloud, or acquisition through an RSS resource link input by the publishing user.

For example, in response to inputting, by the publishing user, clipping information for the complete audio, a visual content is generated for an audio clip corresponding to the clipping information. The visual content is provided with a first preset control for redirecting to the complete audio.

For example, the clipping information is used to identify a start point and an end point of the audio clip that the publishing user wants to cut out. For example, the clipping information comprises a start time point and an end time point of the audio clip, or a start time point and a duration of the audio clip, or an end time point and a duration of the audio clip, etc.

For example, the publishing user may enter numerical values and symbols of the clipping information through an input box.

For example, the publishing user determines the clipping information by controlling some movement controls in an audio track area of the complete audio, wherein the movement controls are used to identify start and end positions of the audio clip.

For example, in response to the publishing user starting to edit the audio clip, an audio clip editing interface is displayed. The audio clip editing interface comprises an audio track area of the complete audio, a first movement control, and a second movement control. The first movement control and the second movement control are respectively used to identify a start position and an end position of the audio clip in the audio track area. In response to the accomplishment of the editing of the audio clip, play time points corresponding to the first movement control and the second movement control are used as the clipping information of the complete audio.

For example, the visual content may be a video content, or may be a multimedia content with a play effect similar to that of video, for example, a multimedia content comprising a dynamic image and an audio material that are played simultaneously. The first preset control can be deployed in the play interface of the visual content.

For example, the visual content comprises description information of the audio clip. The description information comprises, for example, at least one of a title, a cover image, or a text description. In addition, a background, an animation effect or the like can be generated. The description information, background, and animation, etc can be automatically generated or edited by the publishing user, and then can be composited with the audio clip to generate the visual content.

For example, a preview of the visual content of the audio clip is displayed before the publishing of the audio clip's visual content. Thus, the publishing user can adjust the audio clip or other information used to generate the visual content according to the preview effect.

For example, in response to a publishing operation of the publishing user, the audio content of the audio clip can be published into a feed, wherein the audio content comprises the visual content. The feed comprises multiple multimedia contents. A browsing user can watch the multimedia contents in the feed in sequence through switching operations. The multimedia contents comprise, for example, videos, graphics and text, audios, and the like.

Through the above embodiment, a publishing user can select and publish a part of the complete audio, for example, the most attractive and highlight part of the complete audio. Therefore, in a case where a browsing user browses to the visual content corresponding to the audio clip, it is easier for the user to quickly understand the content of the complete audio, and can be redirected to a play interface of the complete audio when interested. Therefore, the above embodiment provides an additional approach to audio access and play, which can improve the information acquisition efficiency of browsing users, and can increase the click-through rate of a creator's audio material.

For example, the feed comprises a short video feed, a graphics and text feed, an audio feed, or the like. In response to a publishing operation of the publishing user, the visual content of the audio clip can be published into a short video feed, and the complete audio can be published into an audio feed.

A short video feed is a feed making it more convenient for browsing users to obtain information, which comprises multiple short videos and visual contents, the length of each video or visual content being less than a preset value. In the process of browsing short videos in a feed, the browsing user watches short videos and visual contents pushed by the system. For example, when a browsing user performs a gesture operation such as a swiping up or swiping down operation, the browsing user may see short videos or visual contents of audio clips published through the preceding embodiment.

The audio feed comprises multiple audios, wherein adjacent audios are, for example, works in the same album. The audio works in most audio feeds are longer than the media contents in short video feeds.

The above embodiment can build a channel between a short video feed and an audio feed, attracting browsing users to browse visual contents of audio clips by means of the short video feed characterized by concentrated amount of information and high information density, and then guiding them to the audio feed. Therefore, it is convenient for browsing users to switch between different categories of media.

For example, a publishing user can trigger the creation and publication of an audio clip by selecting a create control. For example, in response to a publishing user's operation on the create control, an upload page is displayed. The upload page comprises a video upload control and an audio upload control. In response to the publishing user's selection on the audio upload control, an audio upload interface is displayed.

The create tool in the above embodiment supports both publishing of videos and publishing of visual contents of audios. Therefore, the create tool can be applied to a scenario where a video feed and an audio feed coexist, for example, a scenario where visual contents of audio clips are published in a short video feed.

In some embodiments, when the browsing user browses to an audio content, the first preset control is displayed in a first form; after a preset period of time, the first preset control is displayed in a second form for guiding the browsing user to perform a first preset operation.

For example, the first form is a first preset color, and the second form is a second preset color; or the shape of the first preset control corresponding to the first form is different from the shape corresponding to the second form; or the first form has a transparency higher than the second form.

Figure 2A:
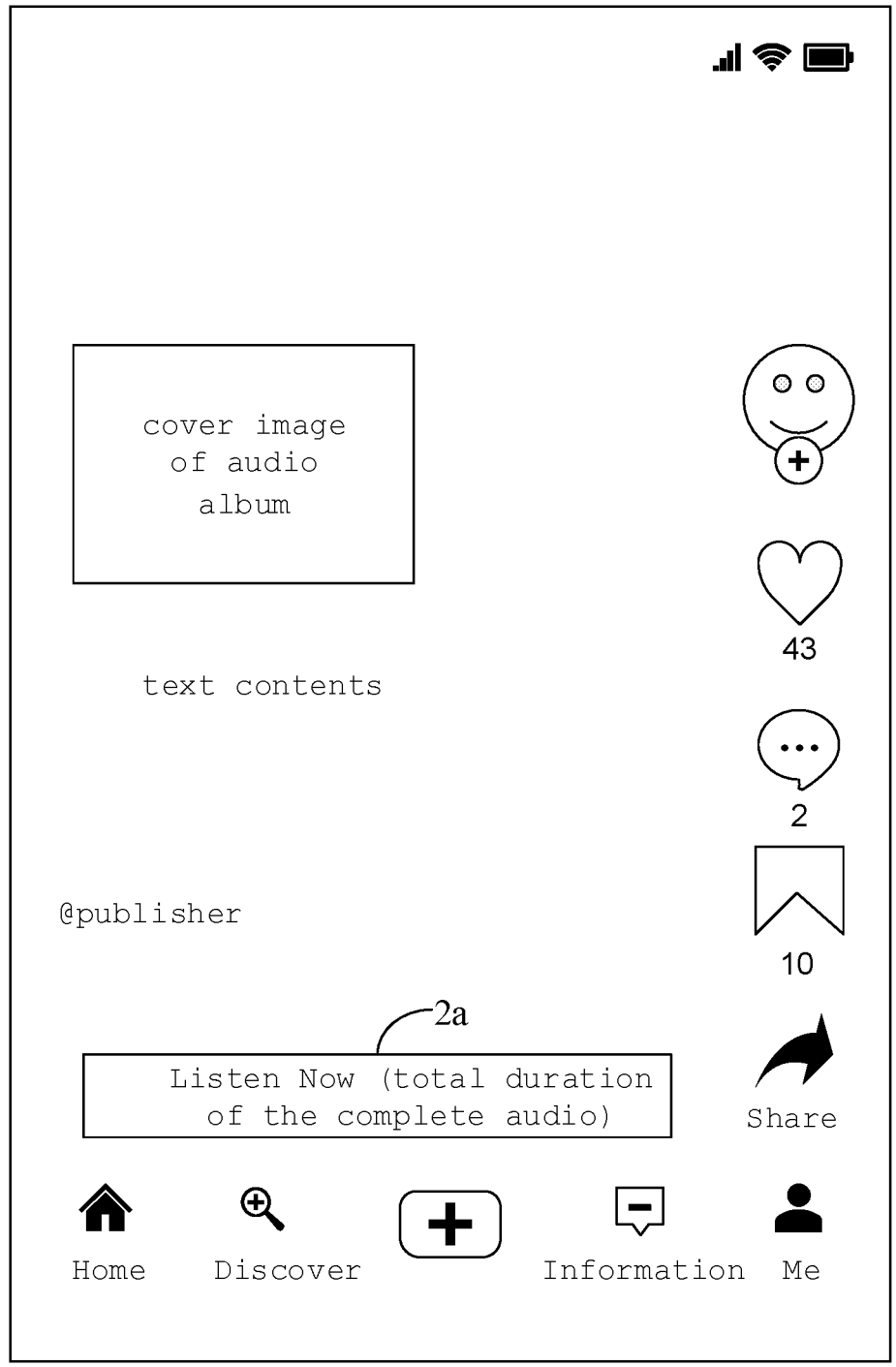
FIGS. 2a to 2b show schematic diagrams of some embodiments of a play interface of the present disclosure.
Figure 2B:
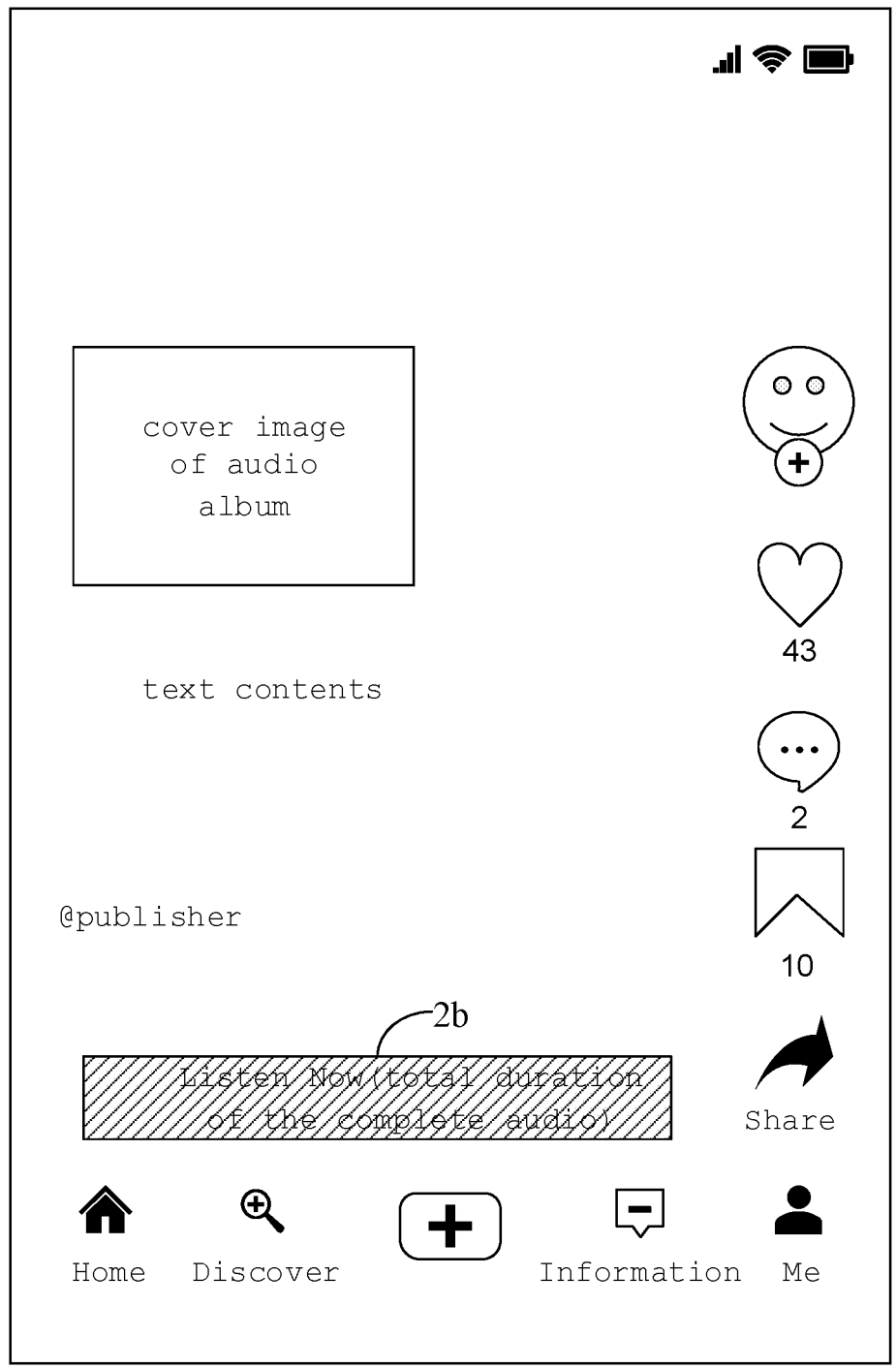

For example, the above technical scheme can be implemented through embodiments shown in FIGS. 2a to 2b.

FIG. 2a shows a schematic diagram of some embodiments of a play interface of the present disclosure.

As shown in FIG. 2a, when playing an audio clip, the first preset control 2a is used to play its complete audio. For example, the first preset control 2a may comprise text information that guides the browsing user to click, such as "Listen Now", and a total duration of the complete audio.

In a case where a browsing user browses to the audio content, the first preset control 2a in the play interface is configured to be colorless and translucent.

As shown in FIG. 2b, after the browsing user stays on the play interface for more than a preset time (e.g., 10 seconds, etc.), the first preset control 2a is switched to the display of the first preset control 2b. For example, the color of the first preset control 2a may be set to the first translucent preset color, and the color of the first preset control 2b may be set to the second opaque preset color.

For example, the play interface may comprise controls such as a User Avatar button, a Like button, a Comment button, a Favorites button, and a Share button.

In some embodiments, the audio content comprises a visual content, and the play interface of the audio content of the visual content comprises at least one of a cover image of an audio album to which the audio content belongs, or related text contents of the audio content. For example, the play interface shown in FIGS. 2a to 2b comprises a cover image of an audio album and text contents corresponding to the audio content, and may further comprise relevant information of the publishing user of the audio content (such as the name of the browsing user, etc.).

For example, an animation effect of the background of the play interface can be set by the publishing user of the audio content; the title of the play interface is set by the publishing user, which can be the title of the audio content by default.

For example, a cover image can be obtained according to the URL (Uniform Resource Locator) of a RSS (Really Simple Syndication) audio content; the text contents can be obtained according to the URL of the RSS audio content.

In some embodiments, the background color of the play interface of the audio content is determined according to colors comprised in the cover image of the audio album to which the audio content belongs. For example, the background color of the play interface shown in FIGS. 2a to 2b comprises a color appearing in the cover image.

In some embodiments, in the case of the play of an audio clip, in response to a third preset operation performed by the browsing user, the play interface can be switched to the play of another media contents contained in a feed, wherein the feed comprises a content of another category than the audio content. For example, the other content categories comprise at least one of graphics and text contents or video contents.

For example, the browsing user can swipe up on the play interface shown in FIGS. 2a to 2b to switch to the display of a media content arranged before the audio content in the feed; or swipe down to switch to the display of a media content arranged after the audio content in the feed.

In some embodiments, in response to a second preset operation of the browsing user, the complete audio of the audio content is added to the Favorites of the browsing user. For example, in response to a second preset operation of the browsing user performed on a second preset control in the play interface of the audio content, the complete audio of the audio content is added to the Favorites of the browsing user.

For example, the second preset control may comprise text information, such as "Listen later" or other function description information. After the browsing user clicks the second preset control, the complete audio is added to the Favorites of the browsing user, and the browsing user can play the complete audio in a Favorites module, such as "My Audios".

In step 120, in response to a first preset operation performed by the browsing user, the complete audio is played for the browsing user.

In some embodiments, in response to a first preset operation performed by the browsing user on the first preset control in the play interface of the audio content, the complete audio is played. For example, after the browsing user clicks the first preset control, on the basis of the current play progress of the audio clip, the complete audio is played continuously.

In the above embodiment, in the process of pushing an audio content contained in a feed, an audio clip is played for the browsing user first, and then the complete audio is played for the browsing user after an operation performed by the browsing user. In this way, the browsing user can confirm whether he/she is interested in the audio content in a relatively short period of time, so that the system can determine whether to push the complete audio to the browsing user, thereby improving the content push efficiency and the browsing user's experience.

Figure 3:
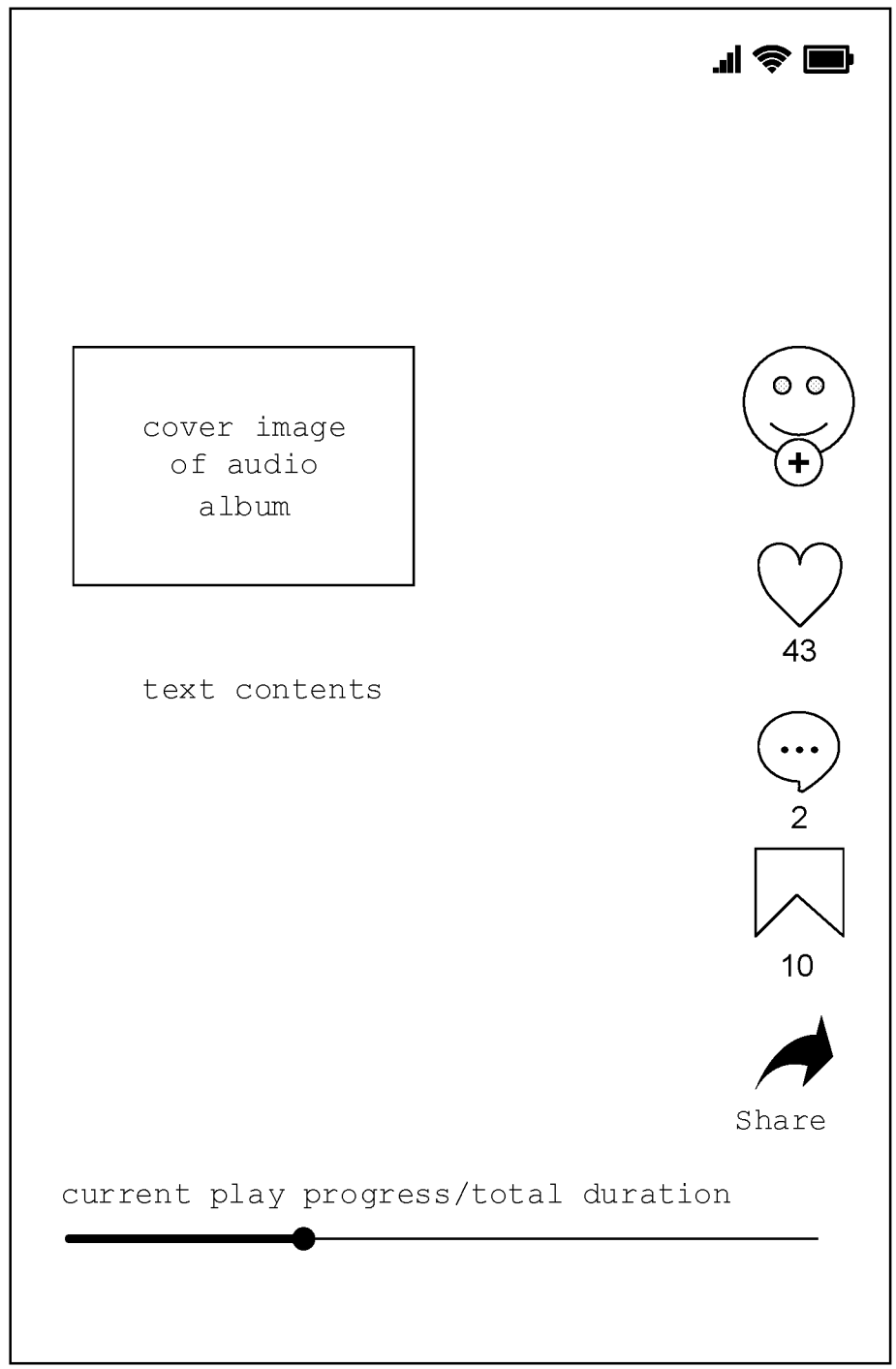
FIG. 3 shows a schematic diagram of other embodiments of a play interface of the present disclosure.

For example, the above technical scheme can be implemented through the embodiment shown in FIG. 3.

FIG. 3 shows a schematic diagram of other embodiments of a play interface of the present disclosure.

As shown in FIG. 3, after the browsing user clicks on the first preset control shown in FIGS. 2a to 2b, the interface switches to the play interface shown in FIG. 3. The play interface comprises a play control of the audio content, wherein the play control comprises a play progress bar, and relevant information of the audio content such as the current play progress and the total duration of the audio content.

In some embodiments, in the case of a play of the complete audio, in response to a fourth preset operation performed by the browsing user, the interface is switched to the play of another audio contents in the audio album to which the audio content belongs, or an audio content in another audio album.

For example, the fourth preset operation comprises a first switching operation and a second switching operation. In response to a first switching operation performed by the browsing user, the interface is switched to the play of another audio contents in the audio album to which the audio content belongs; in response to a second switching operation performed by the browsing user, the interface is switched to the play of audio contents in the another audio album.

For example, the first switching operation and the second switching operation are both sliding operations, which in different directions.

For example, in the play interface of FIG. 3, in response to the browsing user's upward sliding operation, a previous audio content in the audio album to which the current audio content belongs is played for the browsing user; in response to the browsing user's downward sliding operation, a next audio content in the audio album to which the current audio content belongs is played for the browsing user; in response to the browsing user's left sliding or right sliding operation, an audio content in another audio album is played for the browsing user.

Figure 4:
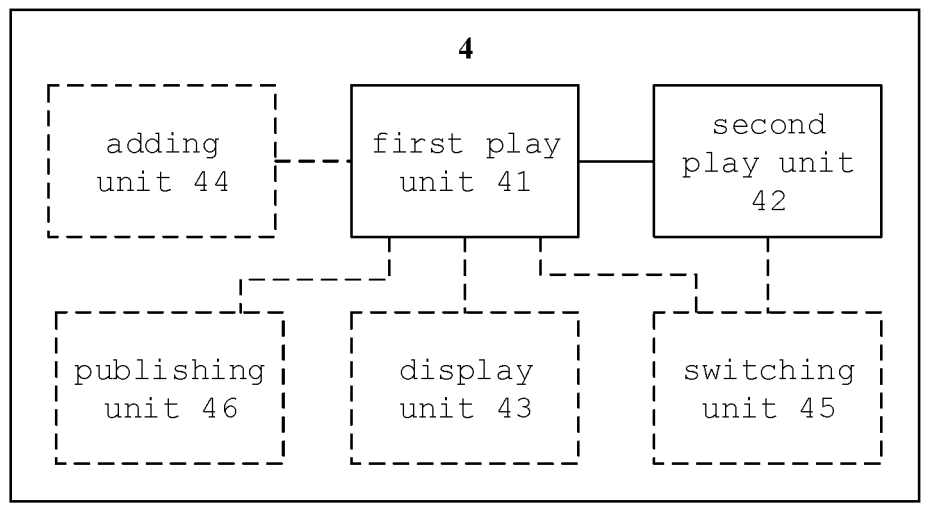
FIG. 4 shows a block diagram of some embodiments of an audio playing apparatus of the present disclosure.

FIG. 4 shows a block diagram of some embodiments of an audio playing apparatus of the present disclosure.

As shown in FIG. 4, the audio playing apparatus 4 comprises: a first play unit 41 for, playing an audio clip of an audio content for a browsing user, in a case where the browsing user browses to the audio content in a feed; a second play unit 42 for, playing a complete audio of the audio content for the browsing user, in response to a first preset operation performed by the browsing user.

In some embodiments, in response to a first preset operation performed by the browsing user on the first preset control in the play interface of the audio content, the second play unit 42 plays the complete audio.

In some embodiments, the audio playing apparatus 4 further comprises: a display unit 43 for, displaying the first preset control in a first form, in a case where the browsing user browses to the audio content, after a preset period of time, displaying the first preset control in a second form for guiding the browsing user to perform a first preset operation.

In some embodiments, the first form is a first preset color, and the second form is a second preset color.

In some embodiments, the first form has a transparency higher than the second form.

In some embodiments, the audio playing apparatus 4 further comprises: an adding unit 44 for, adding the complete audio of the audio content to the favorites of the browsing user, in response to a second preset operation performed by the browsing user.

In some embodiments, the audio playing apparatus 4 further comprises: a switching unit 45 for, in the case of the play of an audio clip, in response to a third preset operation performed by the browsing user, switching to a play of another media content contained in the feed, wherein the feed comprises a content of another category than the audio content; switching to a play of another audio content in an audio album to which the audio content belongs, or an audio content in another audio album, in response to a fourth preset operation performed by the browsing user, in the case of a play of the complete album.

In some embodiments, the fourth preset operation comprises a first switching operation and a second switching operation, wherein in response to a first switching operation performed by the browsing user, the switching unit 45 switches to the play of another audio contents in the audio album to which the audio content belongs; in response to a second switching operation performed by the browsing user, switches to the play of audio contents in the another audio album.

In some embodiments, the first switching operation and the second switching operation are both sliding operations, which however in different directions.

In some embodiments, the display unit 43 determines a background color for the play interface of the audio content according to colors comprised in the cover image of the audio album to which the audio content belongs.

In some embodiments, the audio playing apparatus 4 further comprises: a publishing unit 46 for, in response to inputting, by a publishing user, a clipping information for the complete audio, generating a visual content for an audio clip corresponding to the clipping information, wherein the visual content is provided with a first preset control for switching from a play of the audio clip to the play of the complete audio; in response to a publishing operation of the publishing user, publishing the audio content into a feed, wherein the audio content comprises a visual content; a first play unit 41 for, in the case where a browsing user browses the visual content, playing the audio clip for the browsing user.

In some embodiments, the audio content comprises a visual content, and the play interface of the visual content comprises at least one of a cover image of an audio album to which the audio content belongs, or related text contents of the audio content.

In some embodiments, the feed comprises multiple media contents, comprising at least one of video content, audio content, image content, or text content.

Figure 5:
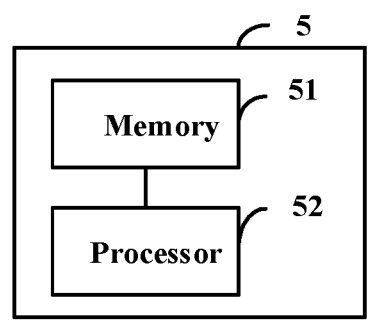
FIG. 5 shows a block diagram of other embodiments of the audio playing apparatus of the present disclosure.

FIG. 5 shows a block diagram of other embodiments of the audio playing apparatus of the present disclosure.

As shown in FIG. 5, the audio playing apparatus 5 of this embodiment comprises: a memory 51 and a processor 52 coupled to the memory 51, the processor 52 configured to, based on instructions stored in the memory 51, carry out the audio playing method according to any one of the embodiments of the present disclosure.

Wherein, the memory 51 may comprise, for example, system memory, a fixed non-transitory storage medium, or the like. The system memory stores, for example, an operating system, applications, a boot loader, a database, and other programs.

Figure 6:
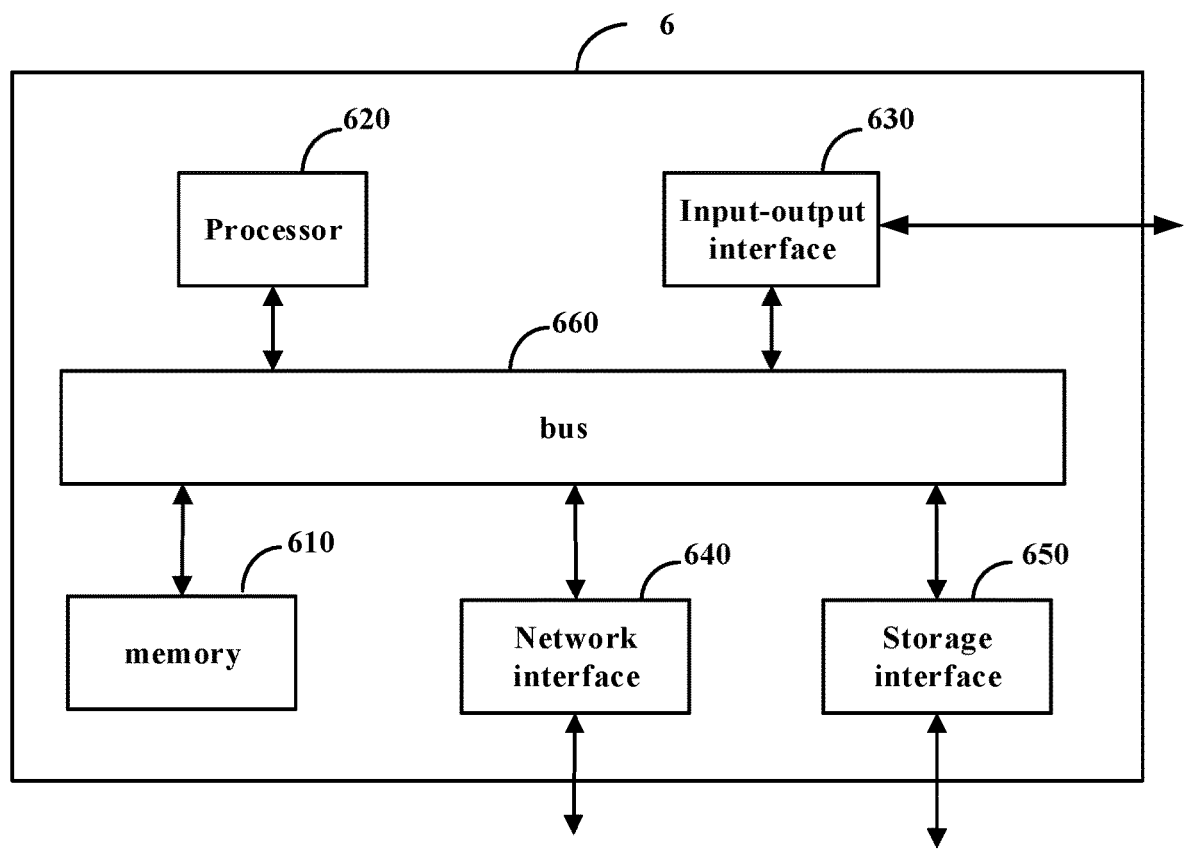
FIG. 6 shows a block diagram of still other embodiments of the audio playing apparatus of the present disclosure.

FIG. 6 shows a block diagram of still other embodiments of the audio playing apparatus of the present disclosure.

As shown in FIG. 6, the audio playing apparatus 6 of this embodiment comprises: a memory 610 and a processor 620 coupled to the memory 610, the processor 620 configured to, based on instructions stored in the memory 610, carry out the audio playing method according to any one of the foregoing embodiments.

The memory 610 may comprise, for example, system memory, a fixed non-transitory storage medium, or the like. The system memory stores, for example, an operating system, application programs, a boot loader, and other programs.

The audio playing apparatus 6 may further comprise an input-output interface 630, a network interface 640, a storage interface 650, and the like. These interfaces 630, 640, 650 and the memory 610 and the processor 620 may be connected through a bus 660, for example. Wherein, the input-output interface 630 provides a connection interface for input-output devices such as a display, a mouse, a keyboard, a touch screen, a microphone, a loudspeaker, etc.

The network interface 640 provides a connection interface for various networked devices. The storage interface 650 provides a connection interface for external storage devices such as an SD card and a USB flash disk.

Those skilled in the art should understand that the embodiments of the present disclosure may be provided as a method, a system, or a computer program product. Therefore, embodiments of the present disclosure can take the form of an entirely hardware embodiment, an entirely software embodiment or an embodiment containing both hardware and software elements. Moreover, the present disclosure may take the form of a computer program product embodied on one or more computer-usable non-transitory storage media (comprising but not limited to disk storage, CD-ROM, optical memory, etc.) having computer-usable program code embodied therein.

Heretofore, the audio playing method, the audio playing apparatus, and the non-transitory computer-readable storage medium according to the present disclosure have been described in detail. In order to avoid obscuring the concepts of the present disclosure, some details known in the art are not described. Based on the above description, those skilled in the art can understand how to implement the technical solutions disclosed herein.

The method and system of the present disclosure may be implemented in many ways. For example, the method and system of the present disclosure may be implemented by software, hardware, firmware, or any combination of software, hardware, and firmware. The above sequence of steps of the method is merely for the purpose of illustration, and the steps of the method of the present disclosure are not limited to the above-described specific order unless otherwise specified. In addition, in some embodiments, the present disclosure may also be implemented as programs recorded in a recording medium, which comprise machine-readable instructions for implementing the method according to the present disclosure. Thus, the present disclosure also covers a recording medium storing programs for executing the method according to the present disclosure.

Although some specific embodiments of the present disclosure have been described in detail by way of example, those skilled in the art should understand that the above examples are only for the purpose of illustration and are not intended to limit the scope of the present disclosure. It should be understood by those skilled in the art that the above embodiments may be modified without departing from the scope and spirit of the present disclosure. The scope of the disclosure is defined by the following claims.

What is claimed is:

1. An audio playing method, comprising:
   playing an audio clip of an audio content for a browsing user, in response to the browsing user browsing to the audio content in a feed in sequence, wherein the feed comprises a plurality of multimedia contents; and
   playing a complete audio of the audio content for the browsing user, in response to a first preset operation performed by the browsing user, wherein
   the playing a complete audio of the audio content for the browsing user, in response to a first preset operation performed by the browsing user comprises:
   playing the complete audio, in response to the first preset operation performed by the browsing user on a first preset control in a play interface of the audio content, wherein the first preset control is configured to switch from a playback of the audio clip to the playback of the complete audio, and the first preset control comprises text information guiding the browsing user to trigger the playback the complete audio and
   the playing the audio clip of the audio content for the browsing user comprises:
   displaying the first preset control in a first form, in response to the browsing user browsing to the audio content; and
   displaying the first preset control in a second form for guiding the browsing user to perform the first preset operation, after a preset period of time.

2. The audio playing method according to claim 1, wherein the first form comprises a first preset color, and the second form comprises a second preset color.

3. The audio playing method according to claim 1, wherein the first form has a transparency higher than the second form.

4. The audio playing method according to claim 1, further comprising:
   adding the complete audio of the audio content to favorites of the browsing user, in response to a second preset operation performed by the browsing user.

5. The audio playing method according to claim 4, wherein adding the complete audio of the audio content to the favorites of the browsing user, in response to the second preset operation performed by the browsing user comprises:
   adding the complete audio of the audio content to the favorites of the browsing user, in response to the second preset operation of the browsing user performed on a second preset control in a play interface of the audio content.

6. The audio playing method according to claim 1, further comprising:
   switching to a play of another media content contained in the feed, in response to a third preset operation performed by the browsing user, in a case of a play of the audio clip, wherein the feed comprises a content of another category than the audio content.

7. The audio playing method according to claim 1, further comprising:
   switching to a play of another audio content in an audio album to which the audio content belongs, or an audio content in another audio album, in response to a fourth preset operation performed by the browsing user, in a case of a play of the complete audio.

8. The audio playing method according to claim 7, wherein:
   the fourth preset operation comprises a first switching operation and a second switching operation, and
   the switching to the play of the another audio content in the audio album to which the audio content belongs, or the audio content in the another audio album, in response to the fourth preset operation performed by the browsing user comprises:
   switching to the play of the another audio content in the audio album to which the audio content belongs, in response to the first switching operation performed by the browsing user; and
   switching to the play of the audio content in the another audio album, in response to the second switching operation performed by the browsing user.

9. The audio playing method according to claim 8, wherein the first switching operation and the second switching operation are sliding operations in different directions.

10. The audio playing method according to claim 1, further comprising:

determining a background color for a play interface of the audio content according to colors comprised in a cover image of an audio album to which the audio content belongs.

11. The audio playing method according to claim 1, further comprising:
generating a visual content for the audio clip corresponding to clipping information, in response to inputting, by a publishing user, a clipping information for the complete audio, wherein the visual content is provided with a first preset control for switching from a play of the audio clip to the play of the complete audio; and
publishing the audio content into the feed, in response to a publishing operation of the publishing user, wherein the audio content comprises the visual content,
wherein playing the audio clip of the audio content for the browsing user, in a case where the browsing user browses to the audio content in the feed comprises:
playing the audio clip for the browsing user, in a case where the browsing user browses to the visual content.

12. The audio playing method according to claim 1, wherein the audio content comprises a visual content, and a play interface of the visual content comprises at least one of a cover image of an audio album to which the audio content belongs, or related text contents of the audio content.

13. The audio playing method according to claim 1, wherein the feed comprises multiple media contents, which comprises at least one of video content, audio content, image content, or text content.

14. An audio playing apparatus, comprising:
a memory; and
a processor coupled to the memory, the processor configured to, based on instructions stored in the memory, carry out:
playing an audio clip of an audio content for a browsing user, in response to the browsing user browsing to the audio content in a feed in sequence, wherein the feed comprises a plurality of multimedia contents; and
playing a complete audio of the audio content for the browsing user, in response to a first preset operation performed by the browsing user, wherein
the playing a complete audio of the audio content for the browsing user, in response to a first preset operation performed by the browsing user comprises:
playing the complete audio, in response to the first preset operation performed by the browsing user on a first preset control in a play interface of the audio content, wherein the first preset control is configured to switch from a playback of the audio clip to the playback of the complete audio, and the first preset control comprises text information guiding the browsing user to trigger the playback the complete audio and
the playing the audio clip of the audio content for the browsing user comprises:
displaying the first preset control in a first form, in response to the browsing user browsing to the audio content; and
displaying the first preset control in a second form for guiding the browsing user to perform the first preset operation, after a preset period of time.

15. The audio playing apparatus according to claim 14, wherein the processor is configured to:
switch to a play of another media content contained in the feed, in response to a third preset operation performed by the browsing user, in a case of a play of the audio clip, wherein the feed comprises a content of another category than the audio content; and
switch to a play of another audio content in an audio album to which the audio content belongs, or an audio content in another audio album, in response to a fourth preset operation performed by the browsing user, in the case of a play of the complete audio.

16. A non-transitory computer-readable storage medium on which a computer program is stored, which when executed by a processor implements:
playing an audio clip of an audio content for a browsing user, in response to the browsing user browsing to the audio content in a feed in sequence, wherein the feed comprises a plurality of multimedia contents; and
playing a complete audio of the audio content for the browsing user, in response to a first preset operation performed by the browsing user, wherein
the playing a complete audio of the audio content for the browsing user, in response to a first preset operation performed by the browsing user comprises:
playing the complete audio, in response to the first preset operation performed by the browsing user on a first preset control in a play interface of the audio content, wherein the first preset control is configured to switch from a playback of the audio clip to the playback of the complete audio, and the first preset control comprises text information guiding the browsing user to trigger the playback the complete audio and
the playing the audio clip of the audio content for the browsing user comprises:
displaying the first preset control in a first form, in response to the browsing user browsing to the audio content; and
displaying the first preset control in a second form for guiding the browsing user to perform the first preset operation, after a preset period of time.

17. The non-transitory computer-readable storage medium according to claim 16, wherein the computer program when executed by the processor implements:
switching to a play of another media content contained in the feed, in response to a third preset operation performed by the browsing user, in a case of a play of the audio clip, wherein the feed comprises a content of another category than the audio content; and
switching to a play of another audio content in an audio album to which the audio content belongs, or an audio content in another audio album, in response to a fourth preset operation performed by the browsing user, in the case of a play of the complete audio.

* * * * *